Sept. 15, 1925. 1,554,046
G. J. SOUKUP
BLOWER FOR HUSKING MACHINES
Filed April 18, 1925   2 Sheets-Sheet 1

Inventor
G. J. Soukup

By Bryant & Lowry
Attorneys

Sept. 15, 1925.　　　　　　　　　　　　　　　1,554,046
G. J. SOUKUP
BLOWER FOR HUSKING MACHINES
Filed April 18, 1925　　　2 Sheets-Sheet 2

Inventor
G. J. Soukup

By Bryant & Lowry
Attorneys

Patented Sept. 15, 1925.

1,554,046

UNITED STATES PATENT OFFICE.

GEORGE J. SOUKUP, OF WAGNER, SOUTH DAKOTA.

BLOWER FOR HUSKING MACHINES.

Application filed April 18, 1925. Serial No. 24,113.

*To all whom it may concern:*

Be it known that I, GEORGE J. SOUKUP, a citizen of the United States of America, residing at Wagner, in the county of Charles Mix and State of South Dakota, have invented certain new and useful Improvements in Blowers for Husking Machines, of which the following is a specification.

This invention relates to new and useful improvements in blowers for husking machines.

The primary object of the invention is the provision of an improved form of blower for the box within which the husking rolls of a corn husking machine operate.

A further object of the invention is the provision of an adjustable nozzle for the type of blower above referred to.

Other objects and advantages of the invention will be apparent during the course of the following description.

Figure 1:
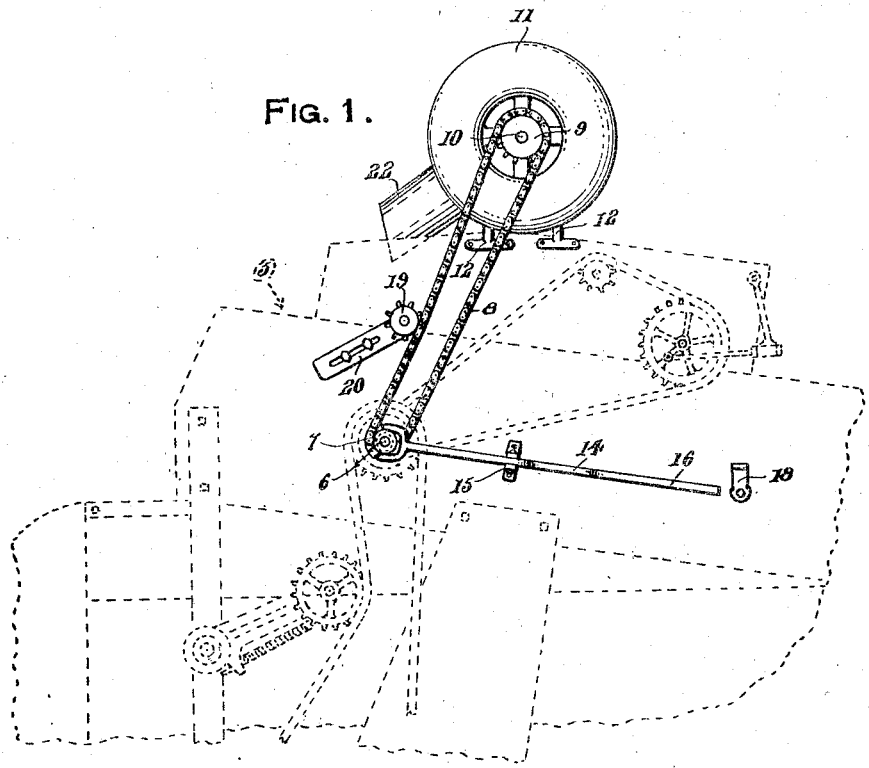
Figure 2:
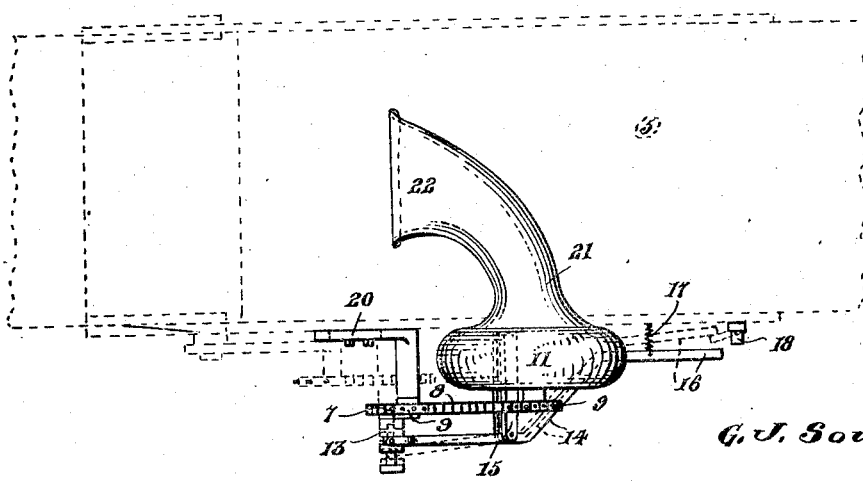
Figure 3:
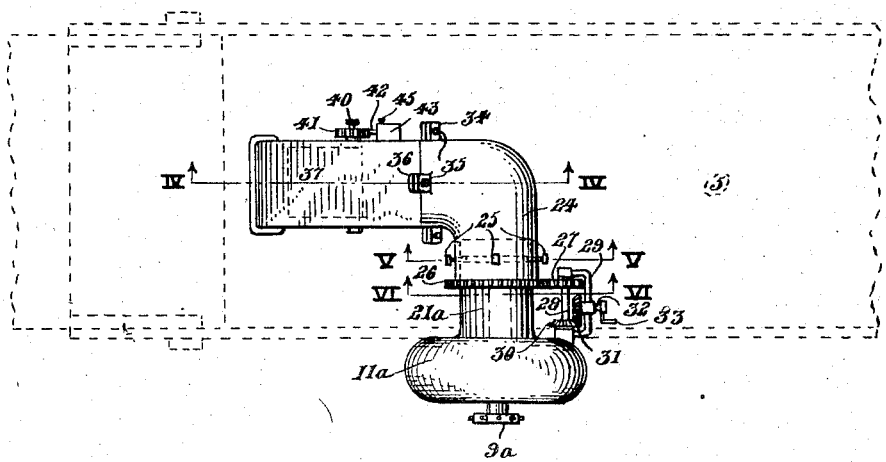
Figure 4:
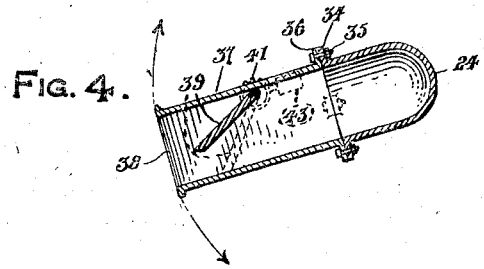
Figure 6:
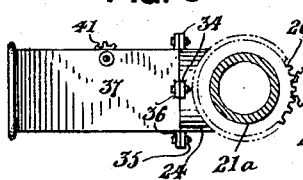
Figure 5:
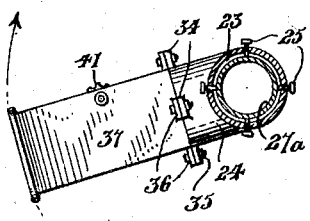
Figure 7:
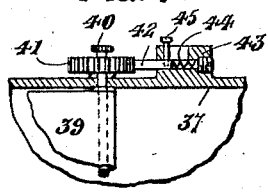

In the accompanying drawings forming a part of this specification and in which like numerals are employed to designate like parts throughout the same, Figure 1 shows in side elevation a blower and its driving mechanism mounted upon the husking portion of a husking machine shown in dotted lines, Figure 2 is a top plan view of the structure shown in Fig. 1, Figure 3 is a top plan view of a modified form of blower, Figure 4 is a longitudinal vertical sectional view taken upon line IV—IV of Fig. 3, Figure 5 is a transverse sectional view taken upon line V—V of Fig. 3, Figure 6 is a transverse sectional view taken upon line VI—VI of Fig. 3, and Figure 7 is a fragmentary longitudinal sectional view showing a flap valve structure and its adjusting and holding mechanism.

In the drawings, wherein for the purpose of illustration is shown the preferred embodiment of this invention, the numeral 5 designates the portion or box of a corn husking machine wherein the husking machine operates and which has a driven shaft 6 upon which it is to be understood a portion of the husking mechanism is carried, but not shown. This shaft 6 has loosely mounted thereon a sprocket wheel 7 having riding thereon a sprocket chain 8 which leads to a sprocket wheel 9 carried by the blower shaft 10 mounted in the blower casing 11 which is supported by the brackets 12 upon the husking box 5. The sprocket wheel 7 is selectively connected to the husking mechanism driven shaft 6 by the clutch structure 13 which is shifted by the angular lever 14 mounted in the bracket 15. The free end 16 of this lever 15 is normally actuated by the spring 17 into a position for causing the driving connection of the sprocket wheel 7 to the shaft 6. A latch structure 18 is mounted upon the husking box 5 and is employed for retaining the lever 14 in its dotted line position, see Fig. 2, which position causes the sprocket wheel 7 to be disconnected from the shaft 6. The chain tightening wheel 19 is mounted upon the adjustable bracket 20 carried by the husking box 5. By means of this last mentioned structure, the sprocket chain 8 may be tensioned to any desired degree. The blower casing 11 has centrally projecting therefrom a discharge pipe 21 which terminates in a nozzle 22 operatively associated with the husking box 5.

In Figs. 3 to 7 inclusive there is shown a slightly modified form of blower which includes the blower casing 11ª having projecting from one end thereof, said end being the intake end of the casing, a sprocket wheel 9ª which is to be connected to the husking drive mechanism in the same manner as illustrated in Figs. 1 and 2 in connection with the first form of blower described. This casing 11ª is formed with a discharge pipe 21ª which is shown in Fig. 5 as having formed in its periphery an annular groove 23. Rotatably, adjustably mounted upon this grooved end of the pipe 21ª is an elbow 24 which has a plurality of adjustable screws 25 projecting into its bore and received within the groove 23 of the discharge pipe 21ª, the screws 25 and groove 23 permitting the nozzle elbow 24 to be adjustably retained upon the pipe 21ª.

In Figs. 3 and 6, the nozzle elbow 24 is illustrated as having formed on its inner end a ring gear 26 which constantly meshes with a gear 27 mounted upon the shaft 28 carried by the bracket bearing 29 which is suitably fastened to the casing 11ª. This shaft 28 has mounted upon its opposite end a bevel gear 30 which meshes with a bevel gear 31 carried by the crank shaft 32 journaled in the bearing bracket 29. This crank shaft 32 is provided with a crank handle 33 by means of which the nozzle elbow 24 may be adjusted upon the discharge pipe 21.

The free end of the nozzle 24 is formed with the plurality of apertured ears 34 which have bolted thereto, by the bolts 35, a similar number of apertured ears 36 carried by the nozzle mouth 37 which has its free end 38 operatively associated with the husking box.

Pivotally mounted within the bore of the nozzle mouth 37 is a flap valve 39 which has mounted upon its supporting shaft an operating knob 40 by means of which the angularity of the flap valve 39 may be varied. For the purpose of retaining this flap valve in any of its desired adjusted positions, a gear 41 is mounted upon the supporting shaft of the flap valve 39 and has associated therewith a latch member 42 carried by the boss 43 on the nozzle mouth 37, as best illustrated in Figs. 3 and 7. This latch 42 is spring pressed into operative relation with the gear 41 by the spring 44 and is further provided with an operating handle 45 by means of which the latch 42 may be shifted against the tension of the spring 44 for disconnecting the gear 41.

It will now be understood that the nozzle elbow 24 and the nozzle mouth 37 may be adjusted in the direction of the arrows shown in Fig. 4 by operating the crank handle 33, shown in Fig. 3. This adjustability of these elements will permit the discharge end 38 of the nozzle mouth 37 to be varied in respect to the husking box 5. To permit the active area of the nozzle mouth 37 to be varied, the flap valve 39 may be adjusted for increasing or decreasing the area of the space in the mouth 37 through which the blast of air is permitted to pass.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:—

In a device of the type described, the combination with a husking box, of a blower case mounted on said box, said blower case having a central discharge pipe, a nozzle elbow adjustable on said pipe, means for manually adjusting said elbow, said means including a ring gear on said elbow, a bearing bracket carried by the case, a shaft journaled in said bracket, a pinion on said shaft meshing with said ring gear, a bevel gear on said shaft, an operating crank journaled in said bracket, and a bevel gear on said crank meshing with the bevel gear of said shaft; a mouth fastened to said nozzle, means for varying the active area of said mouth, said means including a flap valve, an operating knob connected to the valve, a gear connected to the knob, and a spring pressed latch for engaging the gear to hold the valve in any adjusted position; and means for selectively connecting the blower to the husking mechanism drive.

In testimony whereof I affix my signature.

GEORGE J. SOUKUP.